United States Patent
Schulz et al.

(10) Patent No.: US 6,913,288 B2
(45) Date of Patent: Jul. 5, 2005

(54) LOAD LIMITING STRUCTURE FOR VEHICLE OCCUPANT RESTRAINT SYSTEM

(75) Inventors: Kurt Schulz, Harper Woods, MI (US); Barney Bauer, Shelby Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 64 days.

(21) Appl. No.: 10/617,705

(22) Filed: Jul. 14, 2003

(65) Prior Publication Data

US 2005/0012318 A1 Jan. 20, 2005

(51) Int. Cl.[7] .............................................. B60R 22/28
(52) U.S. Cl. ...................... 280/805; 280/808; 297/471; 188/371
(58) Field of Search ................................ 280/805, 808; 297/471, 472, 483; 188/374, 371

(56) References Cited

U.S. PATENT DOCUMENTS

| | | | | |
|---|---|---|---|---|
| 3,438,674 A | * | 4/1969 | Booth et al. ................. | 297/472 |
| 4,239,260 A | * | 12/1980 | Hollowell .................... | 280/806 |
| 4,886,296 A | * | 12/1989 | Brodmann ................... | 280/805 |
| 5,464,252 A | * | 11/1995 | Kanazawa et al. ........... | 280/805 |
| 5,529,344 A | * | 6/1996 | Yasui et al. .................. | 280/808 |
| 5,580,091 A | * | 12/1996 | Doty ........................... | 280/805 |
| 5,971,489 A | * | 10/1999 | Smithson et al. ............ | 297/472 |
| 6,056,320 A | * | 5/2000 | Khalifa et al. ............... | 280/805 |
| 6,099,078 A | * | 8/2000 | Smithson et al. ............ | 297/472 |
| 6,145,881 A | * | 11/2000 | Miller et al. ................. | 280/806 |
| 6,183,015 B1 | | 2/2001 | Smithson et al. ............ | 280/805 |
| 6,196,589 B1 | | 3/2001 | Smithson et al. ............ | 280/805 |
| 6,209,916 B1 | | 4/2001 | Smithson et al. ............ | 280/805 |
| 6,250,681 B1 | * | 6/2001 | Takahashi et al. ........... | 280/805 |
| 6,299,211 B1 | * | 10/2001 | Wier ........................... | 280/806 |

* cited by examiner

*Primary Examiner*—Paul N. Dickson
*Assistant Examiner*—Toan C To
(74) *Attorney, Agent, or Firm*—Lonnie R. Drayer

(57) ABSTRACT

A load-limiting device has a mechanical structure designed to dissipate forces applied by a vehicle occupant to a safety belt during a crash. The load limiting device comprises a housing and a deformable member, at least one of which is configured for connection to a vehicle safety belt and the other of which is configured for connection to a structural part of a vehicle. The housing and the deformable member are moveable relative to each other when force is applied to the one of those members. The housing supports a hardened member formed of a material which is harder than the deformable member and which is positioned to engage and deform the deformable member as the deformable member is being moved relative to the housing.

4 Claims, 9 Drawing Sheets

LOAD LIMITING STRUCTURE FOR VEHICLE OCCUPANT RESTRAINT SYSTEM

FIELD OF THE INVENTION

The present invention relates to a load limiting structure for a vehicle occupant restraint.

BACKGROUND OF THE INVENTION

A typical vehicle occupant restraint system for a vehicle comprises a belt system (often comprising a lap belt portion and a shoulder belt portion) anchored to structural parts of the vehicle such as the floor, a pillar such as a B pillar or to a seat frame. Where the restraint system includes a shoulder belt portion (also referred to herein as a "shoulder harness"), the shoulder harness typically extends through a web guide that is coupled to a structural part of the vehicle such as the B pillar or the seat frame. The restraint system further includes a retractor, often called an "ELR" or emergency locking retractor, which is designed to take up or provide a controlled amount of slack in the belt system when the belt system has been fitted about a vehicle occupant. The retractor allows payout of belt (typically the shoulder belt) in response to movement of the vehicle occupant during normal vehicle operation. However, at the onset of a crash, the retractor becomes automatically locked, to restrain further belt payout, and to keep the vehicle occupant in her or his seat.

The prior art also teaches vehicle occupant restraint systems with tensioning devices, also referred to as "belt tighteners", and/or load-limiting devices, to better control the manner in which force(s) are applied to a vehicle occupant during a crash. Specifically, a tensioning device applies a positive force to the belt immediately at the onset of a crash, to tighten the restraint against the vehicle occupant. A load-limiting device acts between the belt or retractor and a structural part of the vehicle and dissipates force applied to a vehicle occupant during a crash. When a tensioning device/belt tightener and load-limiting device are combined into a vehicle occupant restraint system, the tensioning device reduces residual slack in the seat belt system and the load-limiting device controls the subsequent dissipation of force on a vehicle occupant during the crash.

U.S. Pat. Nos. 6,183,015 B1, 6,196,589 B1 and 6,209,916 B1 teach known types of load limiting devices. In those patents a load limiting device includes a hydraulic piston with fluid chambers on its opposite sides, and a flow control system for controlling flow to one or both chambers, to control movement of the piston under forces applied to the piston by a vehicle occupant restraint system. Moreover, in those patents a crush tube is provided, and is crushed by the piston as the piston moves in one direction in the fluid chamber, to further dissipate forces applied to the piston by a vehicle occupant restraint system.

SUMMARY OF THE INVENTION

The present invention provides a new and useful concept for a load-limiting device for a vehicle occupant restraint system. The load-limiting device comprises a mechanical structure designed to dissipate forces applied to the load-limiting device in a predetermined manner during a vehicle crash, to absorb (take up) force applied to a vehicle occupant during a vehicle crash. Moreover, the design of the load-limiting device of the present invention provides significant flexibility in designing the predetermined manner in which the load-limiting device dissipates forces during a vehicle crash, thereby providing flexibility in how force applied to a vehicle occupant is absorbed during a crash.

According to the present invention, a load limiting device comprises a housing and a deformable member, at least one of which is configured for connection to a component of a vehicle safety restraint and the other of which is configured for connection to a structural part of a vehicle, also referred to herein as an anchor point. The housing and the deformable member are moveable relative to each other in a predetermined manner when force is applied to the one of these members. The housing supports a hardened member formed of a material that is harder than the deformable member and which is positioned to engage and deform the deformable member as the deformable member is being moved relative to the housing.

The configuration of the deformable member can be designed so that the deformable member will deform in a predetermined manner under forces applied to the load-limiting device during a crash. For example, according to one embodiment, the deformable member is configured to deform in a predetermined digressive force manner as the deformable member is being moved relative to the housing. In another embodiment, the deformable member is configured to deform in a relatively constant force manner as the deformable member is being moved relative to the housing. In yet another embodiment, the deformable member is configured to deform in a predetermined progressive force manner as the deformable member is being moved relative to the housing. In yet another embodiment, the deformable member is configured to deform in a digressive step manner as the deformable member is being moved relative to the housing.

These and other features of the present invention will become further apparent from the following detailed description and the accompanying drawings.

DETAILED DESCRIPTION OF THE INVENTION

The present invention relates to a load-limiting device for a vehicle occupant restraint, which dissipates forces applied to the vehicle occupant restraint in a predetermined manner during a crash. The principles of the present invention are applicable to different configurations for a vehicle occupant restraint, and are described below in connection with a belt system that includes a lap belt and shoulder harness (which is often referred to as a three-point safety restraint system). It will be clear to those in the art the principles of the invention are applicable to a variety of vehicle occupant restraints (e.g. front and rear seat belts, etc) and are applicable to vehicle occupant restraints anchored directly to a structural part of a vehicle (e.g. a vehicle floor, B-pillar, etc.) and to vehicle restraints anchored to a vehicle seat.

Figure 1:
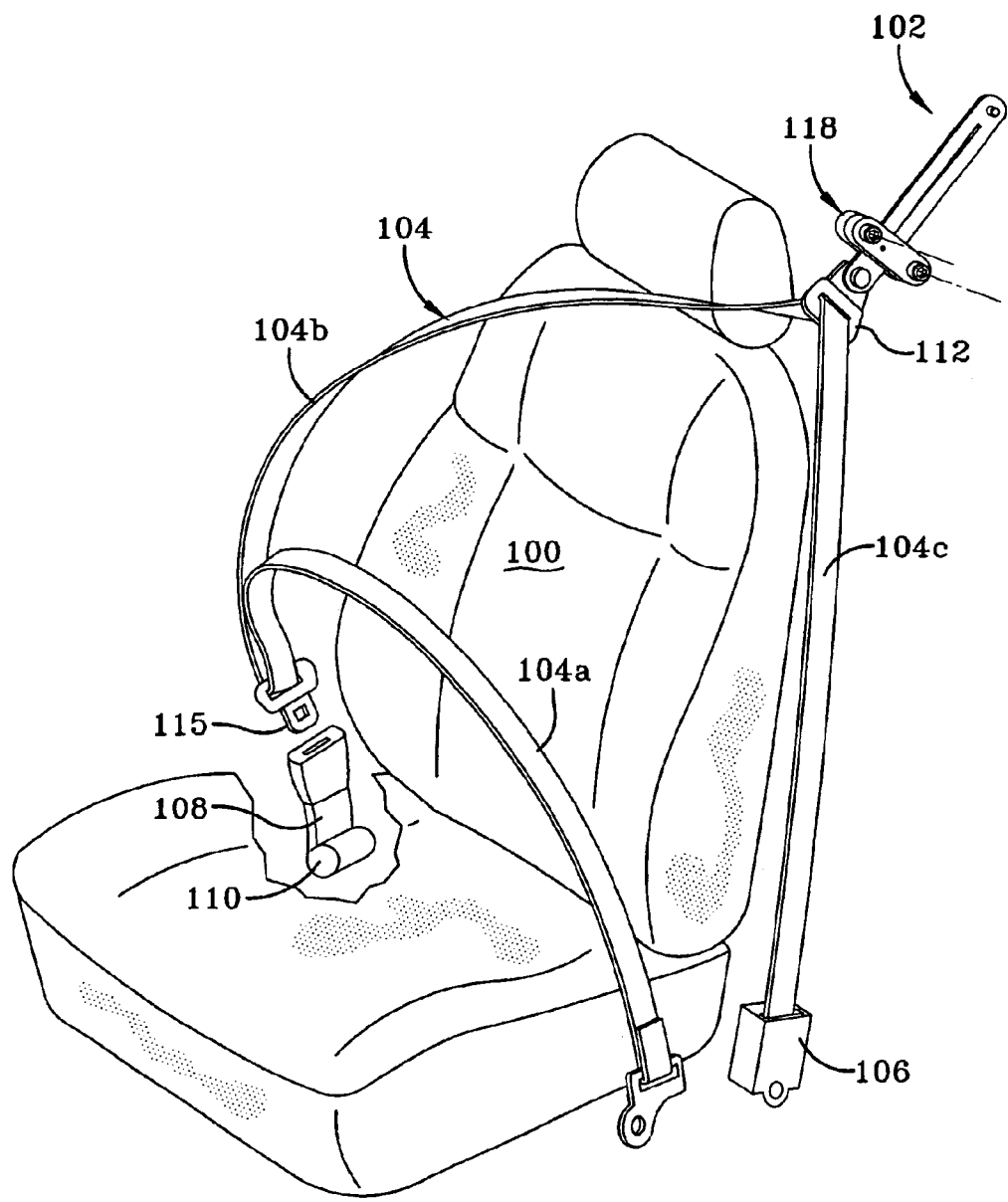
FIG. 1 is a schematic view of a vehicle occupant restraint system with a load-limiting device formed according to the principles of the present invention.

FIG. 1 schematically illustrates a vehicle occupant restraint system 100, which incorporates a load-limiting device 102 according to the present invention. In FIG. 1 the vehicle occupant restraint system is belt 104 designed to fit a vehicle passenger. The belt 104 comprises a lap belt component 104a and a shoulder belt component 104b. The belt also includes a vertical segment 104c that is attached to a retractor located inside a plastic trim 106. The retractor is coupled to a structural part of a vehicle (e.g. the vehicle floor or the base of the vehicle B pillar). Part of the belt is wound about a spool (not shown) of the retractor 106, which allows controlled payout of the belt as the belt is being fitted about a vehicle occupant. A buckle 108 is coupled with an anchor 110 that is secured to a structural part of the vehicle (e.g. the floor of the vehicle). The parts of the belt forming the shoulder component 104b and the vertical segment 104c extends through a web guide (or turning loop) 112 that is coupled to a structural part of a vehicle (e.g. the vehicle B-pillar or the roof rail of the vehicle) by the load-limiting device 102 constructed according to the principles of the present invention. A tongue 115 is connected with the belt 104, and is manually coupled to the buckle 108 by the vehicle occupant. The tongue 115 separates the belt 104 into the lap and shoulder belt components 104a, 104b, but those in the art will recognize that the restraint system can also comprise separate lap belt and shoulder belt components with separate, respective retractors.

During normal vehicle operation, the retractor allows some limited amount of belt payout, if the vehicle occupant shifts position in the vehicle. However, at the onset of a crash, the retractor locks and prevents further belt payout, to restrain the vehicle occupant during the crash. The load-limiting device 102 is designed to absorb kinetic energy of a vehicle occupant as the vehicle occupant loads the belt during a crash. Specifically, when the vehicle occupant loads the belt during a crash, force and energy is applied by the vehicle occupant to the belt, and it is that force and energy that is absorbed by the load-limiting device 102.

Figure 1A:
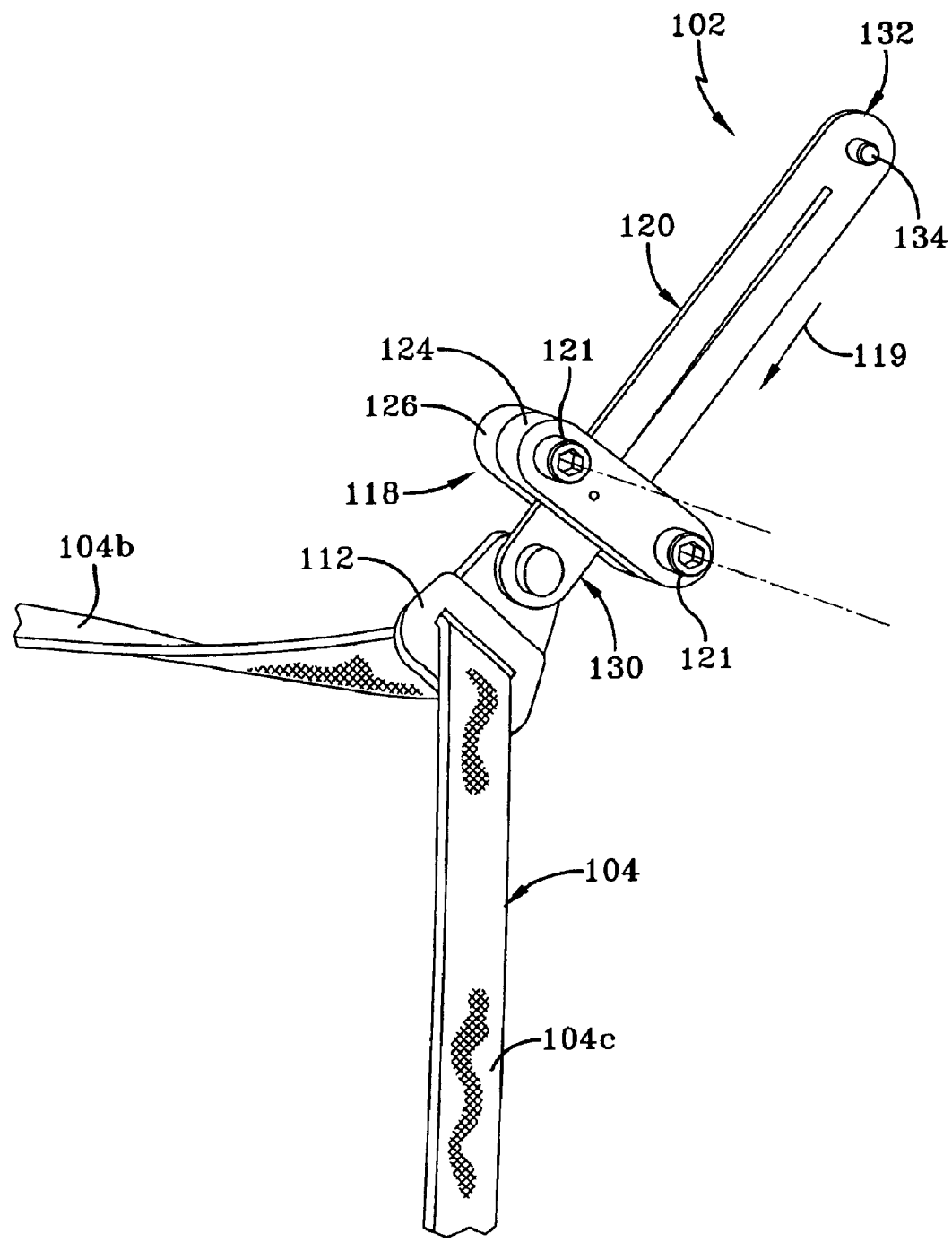
Figure 2:
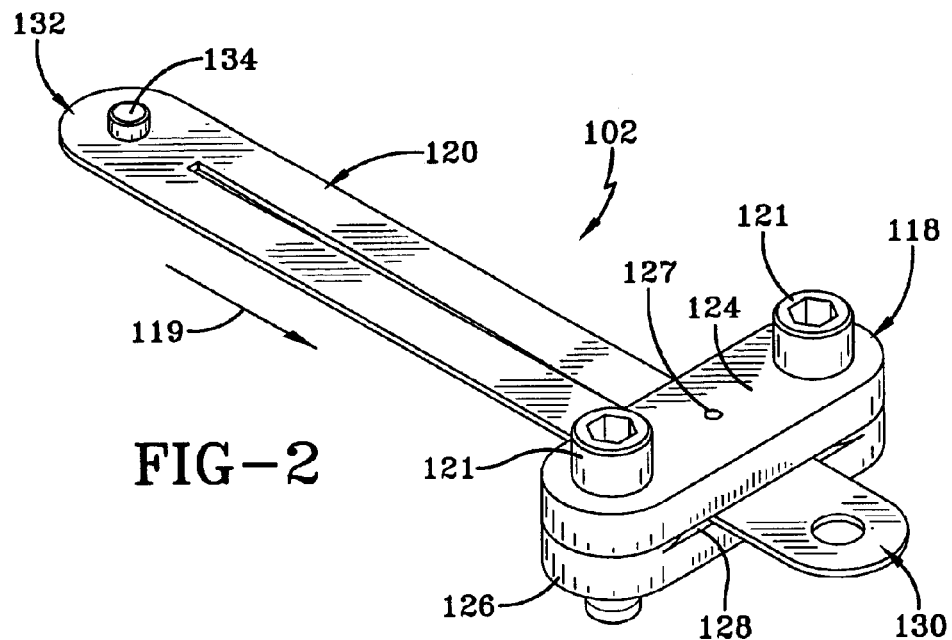
FIG. 2 is a perspective view of a load-limiting device according to one embodiment of the present invention.
Figure 3:
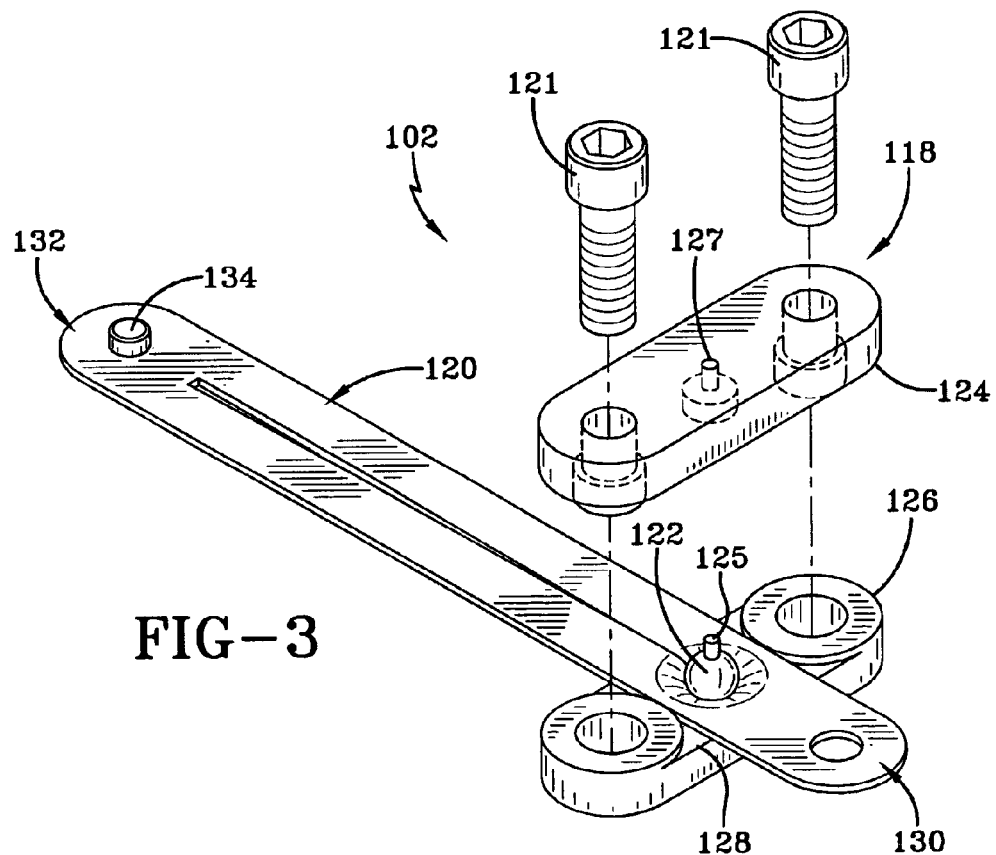
FIG. 3 is an exploded view of the load-limiting device of FIG. 2.
Figure 4:
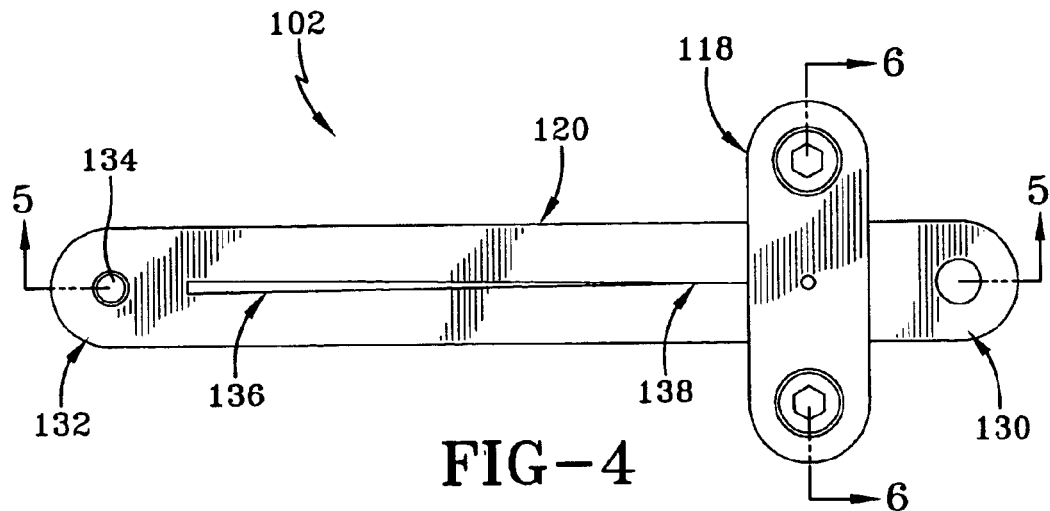
FIG. 4 is a top view of the load limiting device of FIG. 2.
Figure 5:
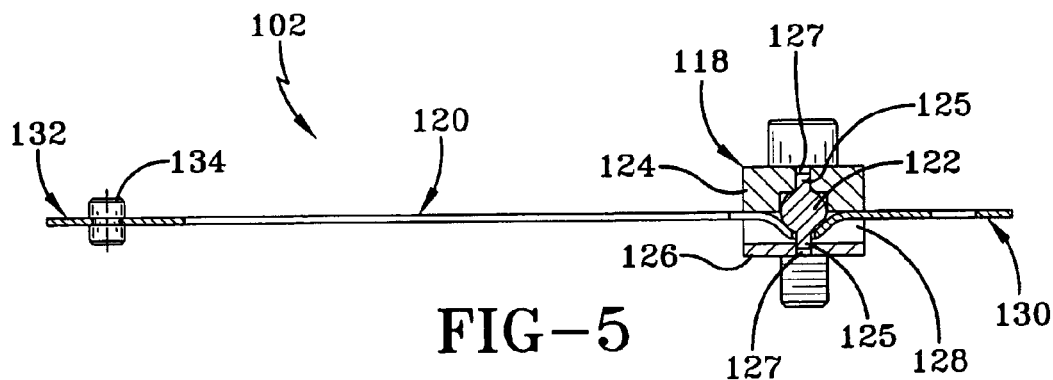
FIGS. 5 and 6 are cross sectional views of the load limiting device of FIG. 4, taken from the directions 5—5 and 6—6, respectively.
Figure 6:
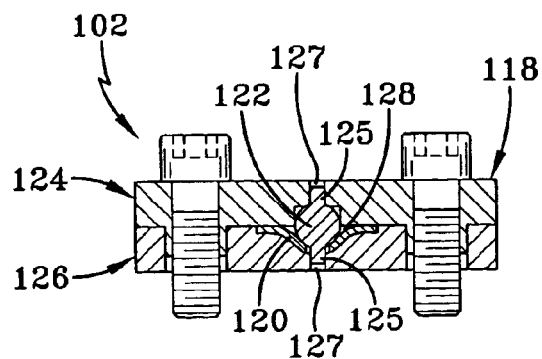
Figure 7:
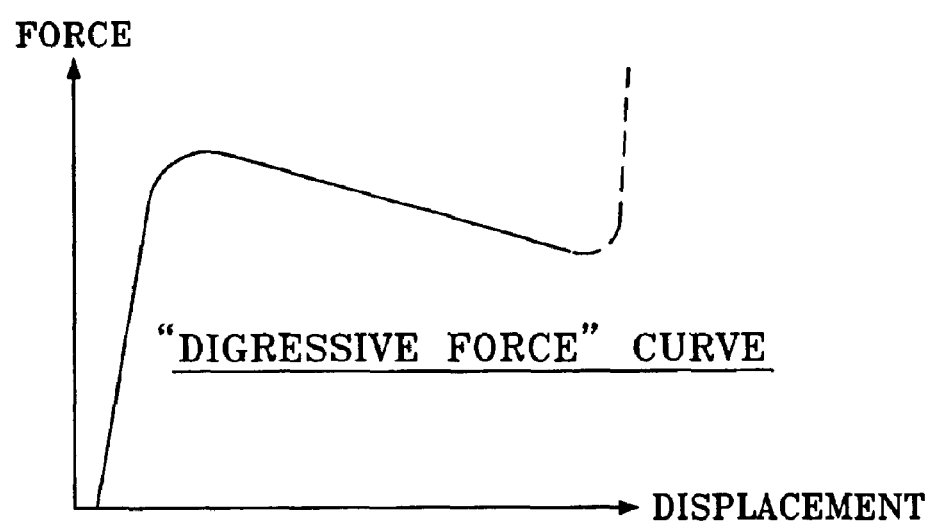
FIG. 7 schematically illustrates a digressive force/displacement curve, to illustrate the digressive manner in which a vehicle occupant restraint with a deformable metal strip of FIGS. 2–6 is configured to dissipate forces as the strip is being pulled through the housing.

Referring to FIGS. 2–6, the load-limiting device 102 includes a housing 118 and a deformable member 120 that is moveable relative to the housing 118 (i.e. in FIGS. 1A, 2 in the direction depicted by arrow 119). The deformable member 120 is connected to the web guide 112 as shown in FIG. 1A. Specifically, the housing 118 is configured for connection to the B-pillar or to the vehicle roof rail (e.g. by bolts or screws 121 that also couple the housing parts 124, 126 together). The housing and the deformable member move relative to each other in a predetermined manner when force from the vehicle occupant restraint is applied to the deformable member 120. The housing 118 has a hardened member, such as a hardened ball 122 (FIGS. 3, 5, 6), formed of a material which is harder than the deformable member 120. The hardened member is positioned to engage and deform the deformable member as the deformable member is being moved relative to the housing The deformable member 120 preferably comprises an oblong metal strip and the housing 118 comprises a pair of interfitting housing components 124, 126 (FIGS. 3, 5, 6) which define an opening (or slot or groove) 128 (FIGS. 2, 6) through which the metal strip 120 is pulled. The hardened member 122 may include one or more stems 125 (two stems are illustrated in FIGS. 5 and 6), which fit into mating holes 127 in the housing components 24, 26. Thus, the hardened member 122 is (i) supported by the housing components 124, 126, (ii) located in the opening 128 and (iii) positioned to engage and deform the metal strip 120 as the metal strip is being pulled through the opening 128 in the housing. This relationship is more clearly shown in FIGS. 3, 5 and 6.

The strip 120 has a first end 130 that is connected to the web guide 112 of the vehicle occupant restraint and a spaced second end 132. The second end 132 includes stop member 134 which extends away from the strip, and limits the effective range of operation of the load limiting metal strip, as described more fully below. A portion of the strip 120 between the first and second ends 130, 132 is configured to be deformed (e.g. plastically deformed) in a predetermined manner when the strip is pulled through the opening 128 in the housing 118 and engaged by the hardened ball 122.

The configuration of the deformable strip 120 can be designed so that the deformable strip will deform in a predetermined manner under forces applied to the load-limiting device 102 during a crash. For example, according to one embodiment, which is illustrated in FIGS. 2–7, the deformable strip 120 is configured to deform in a predetermined digressive force manner as the deformable member is being moved relative to the housing 118. As used herein and in the claims "digressive force manner" means that the force rises quickly and then declines gradually as force is applied to the vehicle occupant through the restraint. In another embodiment, illustrated in FIGS. 8–10, the deformable strip 120 is configured to deform in a predetermined relatively constant force manner as the deformable strip is being moved relative to the housing 118.

Figure 11:
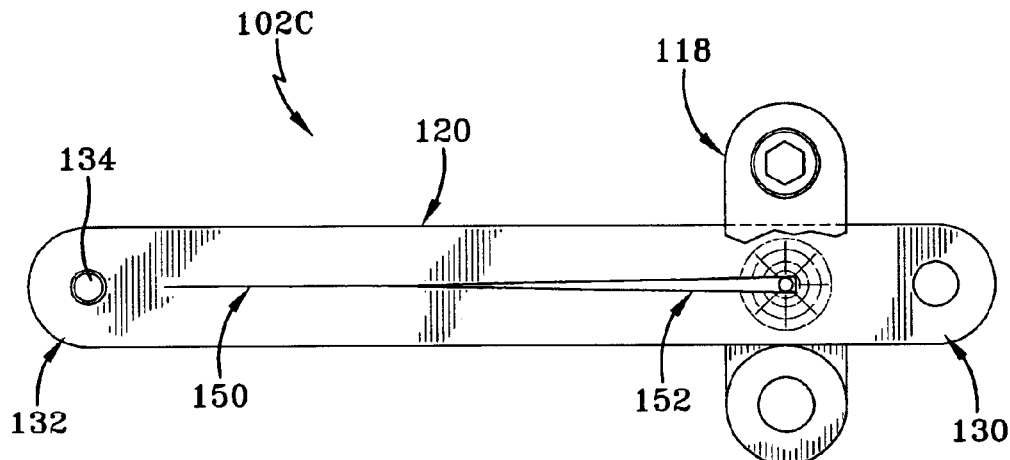
FIG. 11 schematically illustrates a load-limiting device comprising a deformable metal strip configured to deform in a predetermined progressive force manner as the strip is being pulled through the housing, in accordance with yet another embodiment of the present invention.
Figure 12:
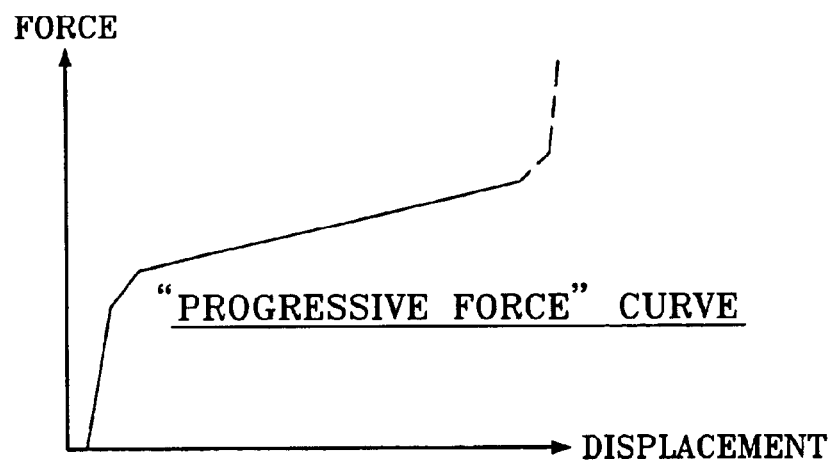
FIG. 12 schematically illustrates a progressive force/displacement curve, to illustrate the digressive manner in which a vehicle occupant restraint with the deformable metal strip of FIG. 11 is configured to dissipate forces as the strip is being pulled through the housing.

In yet another embodiment, illustrated in FIGS. 11 and 12, the deformable 120 is configured to deform in a predetermined progressive force manner as the deformable strip is being moved relative to the housing 118. As used herein and in the claims "progressive force manner" means that the force initially rises quickly, and then increases more gradually as force is applied to the vehicle occupant through the restraint.

Figure 13:
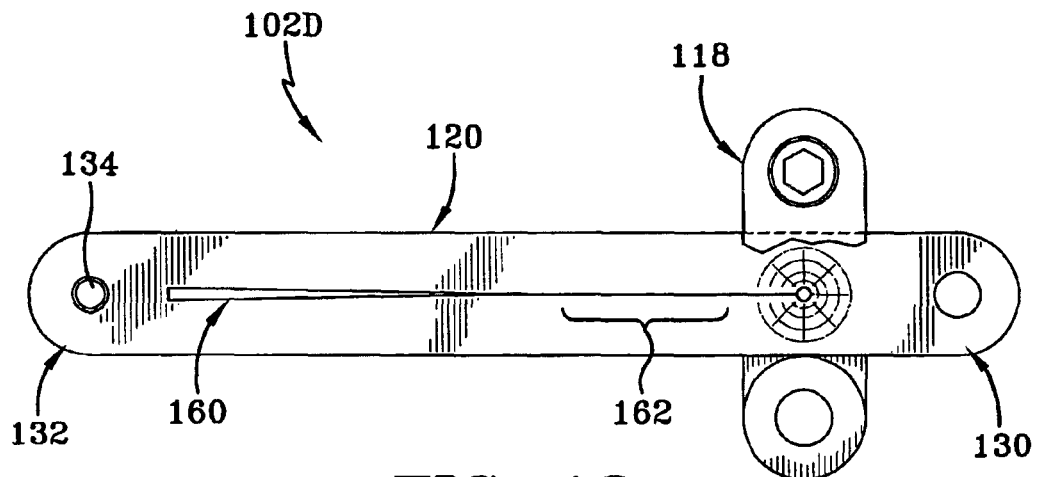
FIG. 13 schematically illustrates a load-limiting device comprising a deformable metal strip configured to deform in a predetermined digressive step force manner as the strip is being pulled through the housing, in accordance with another embodiment of the present invention.
Figure 14:
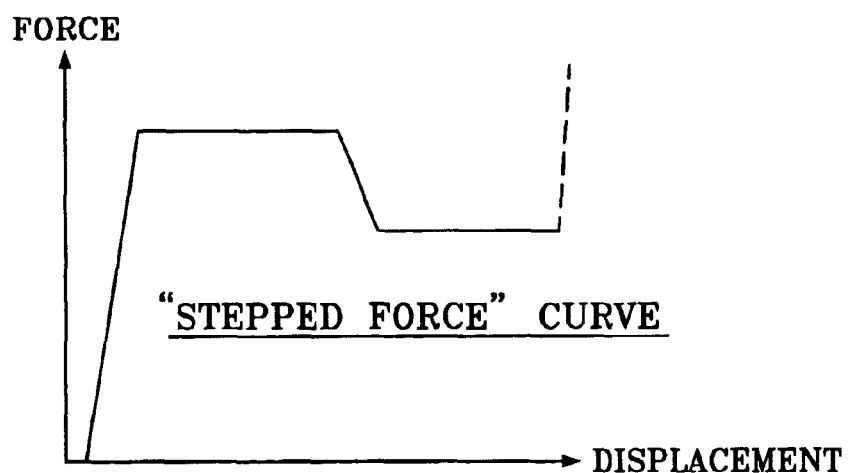
FIG. 14 schematically illustrates a digressive step force/displacement curve, to illustrate the digressive manner in which a vehicle occupant restraint with the deformable metal strip of FIG. 13 is configured to dissipate forces as the strip is being pulled through the housing.

In yet another embodiment, illustrated in FIGS. 13 and 14, the deformable strip is configured to deform in a digressive step manner as the deformable strip is being moved relative to the housing 118. As used herein and in the claims "digressive step manner" means that the force raises quickly and then has a relatively constant force response followed by a gradually declining force response as force is applied to the vehicle occupant through the restraint.

As used herein and in the claims reference to the deformable strip 120 deforming in a predetermined manner is intended to mean that the force/displacement curve representing the way the restraint system responds (and dissipates forces) when a vehicle occupant loads the restraint system has a predetermined form. In the description of the embodiments that follow, the force/displacement curves are intended to illustrate generally the force/displacement relationships when a vehicle occupant loads the restraint system, but are not intended to represent actual data.

In the embodiment of FIGS. 2–7, the deformable strip 120 is configured to deform in a predetermined digressive force manner (see FIG. 5) as the strip is being pulled through the housing 118. As used herein and in the claims "digressive force manner" means that the force rises quickly, and then declines gradually as the vehicle occupant loads the restraint system. To provide such a digressive force deformation, the strip 120 has a longitudinally extending, triangular central opening 136 (FIG. 4), which has a narrower end 138 near the first connection 130, so that the hardened ball 122 engages the narrower end 138 earlier as the ball deforms the strip. The central opening 136 progressively widens as the strip is pulled through the opening 128 in the housing, so that the ball encounters decreasing resistance to deformation as the strip 118 is pulled through the opening 128, thereby producing the digressive force characteristics of FIG. 7 on the vehicle occupant restraint. Also, it should be noted that as the strip is pulled through the opening 128, the stems 125 (which are located in the holes 127 in the housing components 124, 126) hold the hardened member 122 in place, thereby causing the strip 120 to be deformed by the hardened member as the strip 120 is pulled through the opening 128 in the housing.

While the hardened member 122 disclosed is a ball with stems 125 that fit into holes 127 in the housing components 124, 126, the dimensions of the ball and the housing components may be controlled tightly enough that the stems and holes may not be necessary to hold the hardened member in place in the housing. Either housing component may have a hardened portion formed in one piece with that housing component and configured to engage and deform the strip 120 as the strip is pulled through the housing.

Figure 8:
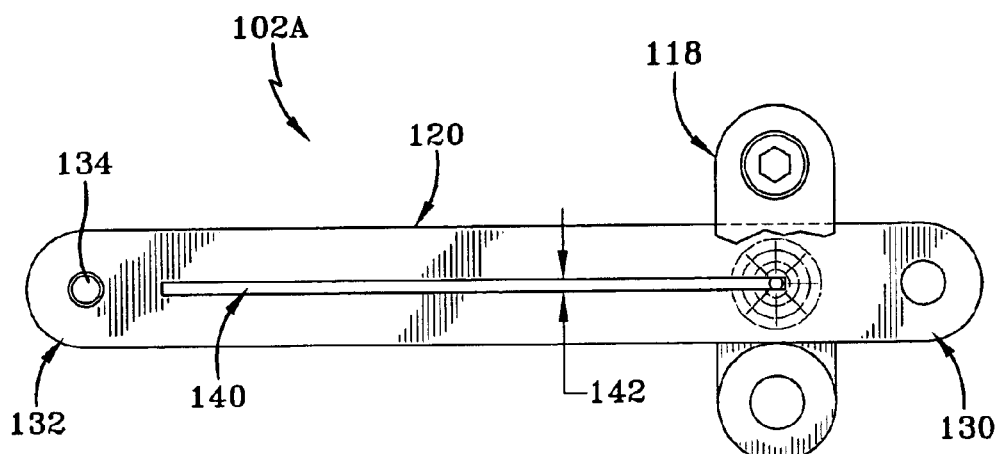
FIG. 8 is a top view of a load-limiting device comprising a deformable metal strip configured to deform in a predetermined relatively constant force manner as the strip is being pulled through the housing, in accordance with another embodiment of the present invention.
Figure 10:
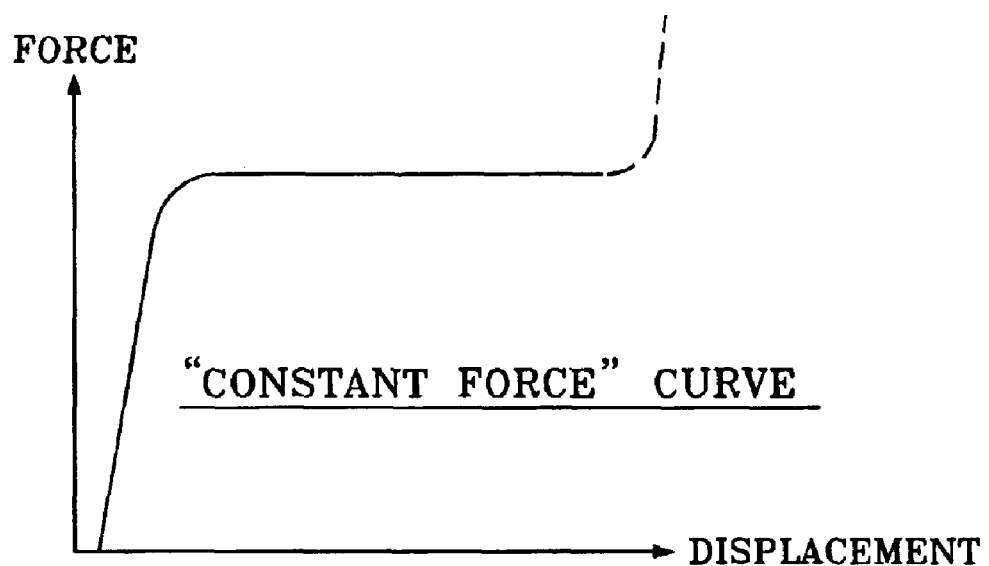
FIG. 10 schematically illustrates a relatively constant force/displacement curve, to illustrate the constant force manner in which a vehicle occupant restraint with the deformable metal strip of FIG. 8 or 9 is configured to dissipate forces as the strip is being pulled through the housing.

In the embodiment of FIGS. 8 and 10, the deformable strip 120 is configured to deform in a predetermined relatively constant force manner (see FIG. 10) as the strip is being pulled through the housing 118. To provide such a relatively constant force deformation, the strip 120 has a longitudinally extending rectangular shaped central opening 140 that has a generally constant width 142. Thus, the hardened ball 122 encounters a generally constant resistance to deformation as the strip 120 is pulled through the housing 118, thereby producing the relatively constant force/displacement characteristics of FIG. 10 on the vehicle occupant restraint.

Figure 9:
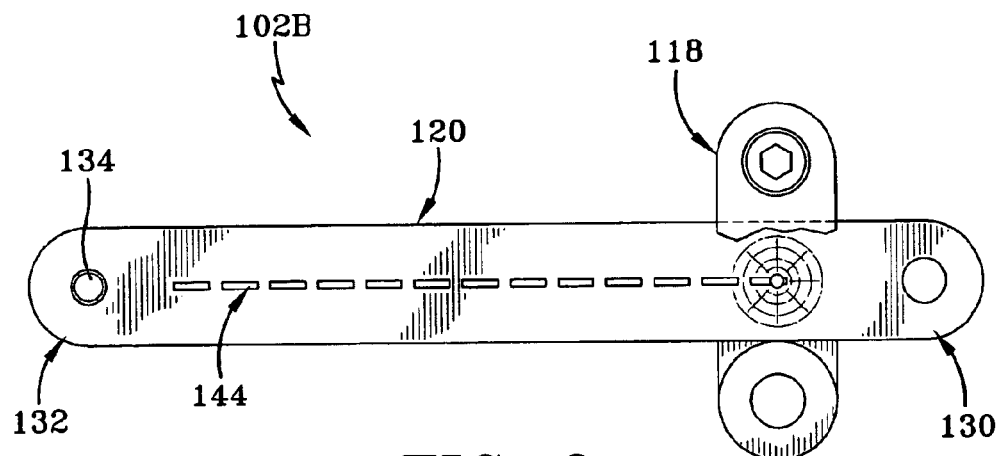
FIG. 9 is a top view of another form of load-limiting device comprising a deformable metal strip configured to deform in a predetermined relatively constant force manner as the strip is being pulled through the housing, in accordance with another embodiment of the present invention.

In addition, in the embodiment shown in FIG. 9, the deformable strip 120 is also configured to deform with relatively constant force/displacement deformation characteristics. Specifically, the strip either has no longitudinal extending central opening, that is, it is a solid piece of metal through its operating length), or it has a longitudinal perforation 144 along its centerline. If the strip has no central opening, and the hardened ball 122 deforms the strip 120 in a manner that is relatively constant along the perforation, so that the deformation of the strip should deform with relatively constant force/displacement deformation characteristics. If the strip has a longitudinal perforation 144 along its centerline, the perforation 144 will provide the strip 120 with some central weakness, allowing the deformation of the strip to be initiated easier than it would without the perforation, but once initiated the deformation of the strip will be relatively constant along the perforation, and the strip will deform with relatively constant force/displacement deformation characteristics as shown in FIG. 10.

In the embodiment illustrated in FIGS. 11 and 12, the deformable strip 120 is configured to deform with predetermined progressive force/displacement characteristics, as shown in FIG. 12, as the strip 120 is being pulled through the housing 118. As used herein and in the claims "progressive force/displacement characteristics" means that the force initially rises quickly, and then gradually increases as the vehicle occupant loads the restraint. Specifically, the strip has a longitudinally extending central opening 150 that is triangularly shaped, with a wider leading end 152 near the first part 130 of the strip that is coupled to the vehicle occupant restraint. With this configuration, the initial deformation of the strip requires less energy, on account of the wider leading end 152 of the central opening 150. However, as the deformation of the strip progresses, more energy is required, because the central opening progressively narrows as the strip is pulled through the housing 118. Hence, the deformation of the strip requires progressively more energy, and the deformation characteristics will conform to the progressive force/displacement deformation characteristics of FIG. 12.

In the embodiment of FIGS. 13 and 14, the deformable strip 120 is configured to deform in a digressive step manner (FIG. 14) as the strip is being pulled through the housing. As used herein and in the claims "digressive step manner" means that the force/displacement characteristic raises quickly, and then has a relatively constant force/displacement response followed by a gradually declining force/displacement response as the vehicle occupant loads the restraint. Specifically, the strip 120 has a longitudinally extending central opening 160 with a relatively narrow portion 162 nearest the first coupling 130, and which maintains that narrow width for a predetermined longitudinal extent and then progressively widens as it extends longitudinally away from the relatively narrow portion 162. Thus, the strip requires a relatively high amount of energy to deform it over a predetermined length (i.e. the length of the narrow portion 162) and achieves a relatively constant force/displacement response, and then gradually less energy to deform it because it then progressively widens as it continues to be pulled through the housing 118, thereby providing the digressive step force/displacement deformation characteristics of FIG. 14.

In each of the foregoing embodiments, load-limiting device can be selectively designed (i.e. "tuned") for a particular type of performance. For example, the deformation characteristics of the load-limiting device are at least partially determined by the configuration of the central portion of the strip 120, i.e. the configuration of the central openings 136, 140, 150, 150, the perforations 144, or the absence of a central opening. In addition, there are other features of the load-limiting device that allow the load-limiting device to be selectively designed for a particular type of performance. Those features include the modulus of elasticity of the deformable strip, the thickness of the deformable strip, the diameter of the ball (or other geometry of the deforming member), other geometric characteristics of the deformable member, and the materials of the deforming member and the deformable member.

In addition, in all of the foregoing embodiments, the second portion 132 of the deformable strip 120 has the stop 134 that will engage the housing 118 at the end of travel of the strip relative to the housing. A stop member 134 can be attached to the second end of the strip can form the stop 134, for example, or the stop can be formed in one piece with the strip. The stop 134 is configured so that if strip 120 is pulled through the housing to a point where the stop 134 engages the housing, the deformation of the strip will cease, and the load on the vehicle occupant will rise dramatically. However, by that time, the load-limiting device will have basically done its job, and other aspects of the restraint system (e.g. a vehicle air bag) will be primarily responsible for absorbing the energy of a vehicle occupant during the crash. Thus, the stop 134 is not part of the parameters that determines the deformation characteristics of the strip, as will be readily appreciated by those in the art.

In determining which type of deformation characteristics may best suit a load limiting device for a vehicle occupant restraint, basically the crash characteristics of the vehicle and the environment in which the vehicle occupant restraint is expected to function drive such determinations. As the load-limiting device performs its function, it converts the kinetic energy of the vehicle occupant into the "work" required to deform the load-limiting device. The more energy absorbed by the deformation of the vehicle occupant restraint, the less energy and force that is applied to the vehicle occupant by the restraint system during a crash. The earlier in the crash the load limiting device begins taking up the kinetic energy of the vehicle occupant, the more time the vehicle occupant restraint has to transfer energy into the vehicle and the transfer of such energy can be at a lower rate and consequently at lower peak loads. Thus, it will more often be desirable for the load-limiting device to have digressive (FIGS. 2–7) or digressive step (FIGS. 13, 14) deformation characteristics, to provide the highest take up of vehicle occupant kinetic energy early in the crash.

It should be noted that while in the illustrated embodiment the housing 118 is fixed to a structural part of the vehicle, and one end of the strip 120 is coupled to the vehicle occupant restraint and is pulled through the housing 118, that configuration could be reversed, i.e., one end of the strip 120 could be fixed to the structural part of the vehicle, and the housing 118 could be coupled to the vehicle occupant restraint. In either configuration, the strip is pulled through the housing, which results in the deformation of the strip, with the types of deformation characteristics described above.

It should be noted that it is currently contemplated that the deformable strip would be formed of 1010 to 1020 mild steel, but other types of relatively mild, deformable material will occur to those in the art. In addition, it is currently contemplated that the hardened member may be formed, e.g. of A2 tool steel hardened to Rockwell C of 65, or by a milder steel that is chrome plated to the appropriate hardness. It is also recognized that other types of materials for forming the hardened member will occur to those in the art.

The foregoing disclosure provides a load-limiting device for a vehicle occupant restraint that is designed to dissipate forces applied to the vehicle occupant in a predetermined manner during a crash, to absorb energy applied to a vehicle occupant during a crash. Moreover, the design of the load-limiting device of the present invention provides significant flexibility in designing the predetermined manner in which the load-limiting device dissipates forces during a crash, thereby providing flexibility in how energy of a vehicle occupant is absorbed during a crash. With the foregoing disclosure in mind, there will be other modifications and developments that will be apparent to those in the art.

We claim:

1. An apparatus comprising a load limiting device which serves as a connection between a vehicle safety restraint and an anchor point, the load limiting device comprising a housing and a deformable member, at east one of which is configured for connection to a vehicle safety restraint and the other of which is configured for connection to the anchor point, the housing and the deformable member being moveable relative to each other in a predetermined manner when force is applied to one or the other of the housing and the deformable member, and the housing having a hardened member which is harder than the deformable member, the hardened member positioned to engage and deform the deformable member as the deformable member moves relative to the housing;

the housing comprising a pair of housing components which define an opening through which the deformable member is pulled and wherein the hardened member comprising a ball made of hardened steel that is (i) supported by the housing components, (ii) located in the opening in the housing and (iii) positioned to engage and deform the deformable member as the deformable member is being pulled through the opening in the housing; and the deformable member comprising a strip formed of mild steel and having a first portion configured for connection to a component of safety restraint system and a second portion having a stop; the strip having a central portion located between the first and second portions that is configured to be deformed in a predetermined manner when the strip is pulled through the housing and engaged by hardened member.

2. The apparatus of claim 1 wherein the strip is configured to deform in a digressive force manner as the strip is being pulled through the housing.

3. The apparatus at claim 1, wherein the strip is configured to deform in a digressive step manner as the strip is being pulled through the housing.

4. The apparatus of claim 1, wherein the deformable member is configured to deform in a digressive force manner as the deformable member is being moved relative to the housing.

* * * * *